US011972912B2

(12) United States Patent
Greenspan et al.

(10) Patent No.: US 11,972,912 B2
(45) Date of Patent: Apr. 30, 2024

(54) 3D-PRINTED DEFORMABLE INPUT DEVICES

(71) Applicant: Accenture Global Solutions Limited, Dublin (IE)

(72) Inventors: Mark Benjamin Greenspan, San Francisco, CA (US); Lavinia Andreea Danielescu, San Francisco, CA (US)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 17/573,752

(22) Filed: Jan. 12, 2022

(65) Prior Publication Data

US 2022/0359131 A1 Nov. 10, 2022

Related U.S. Application Data

(60) Provisional application No. 63/186,281, filed on May 10, 2021.

(51) Int. Cl.
*B33Y 50/02* (2015.01)
*H01H 13/14* (2006.01)
(Continued)

(52) U.S. Cl.
CPC ............ *H01H 13/14* (2013.01); *H01H 13/20* (2013.01); *H01H 13/70* (2013.01); *H01H 2231/018* (2013.01)

(58) Field of Classification Search
CPC ...... H01H 3/125; H01H 13/705; H01H 13/14; H01H 13/04; H01H 13/10; H01H 13/70; H01H 13/704; H01H 13/7065; H01H 13/7006; H01H 13/7057; H01H 13/78; H01H 13/79; H01H 13/52; H01H 13/703; H01H 13/507; H01H 3/12; H01H 13/20;
(Continued)

(56) References Cited

U.S. PATENT DOCUMENTS

| | | | | |
|---|---|---|---|---|
| 4,489,302 | A | 12/1984 | Eventoff | |
| 6,600,120 | B1 * | 7/2003 | Marmaropoulos .. | H01H 13/702 200/515 |

(Continued)

OTHER PUBLICATIONS

Extended Search Report in European Appln. No. 22170511.4, dated Nov. 18, 2022, 8 pages.

(Continued)

*Primary Examiner* — Ahmed M Saeed
(74) *Attorney, Agent, or Firm* — Fish & Richardson P.C.

(57) ABSTRACT

Electrical input devices can be produced using a multi-material 3D-printing process. The electrical input devices can include a non-conductive material portion and a conductive material portion. The non-conductive and conductive material portions are integrally formed during a single 3D-printing process. Deformation of the electrical input devices cause an electrical variance of the conductive material portion that is responsive to the deformation. Some electrical input devices described provide digital responses, and some electrical input devices described provide analog responses. The described techniques can be used to manufacture complex finished devices in a single 3D-print run, and, in some examples, without the need for post-processing or assembly.

9 Claims, 11 Drawing Sheets

(51) Int. Cl.
*H01H 13/20* (2006.01)
*H01H 13/70* (2006.01)

(58) Field of Classification Search
CPC .. B64D 11/0638; B64D 11/0644; B33Y 80/00
See application file for complete search history.

(56) References Cited

U.S. PATENT DOCUMENTS

| | | | | |
|---|---|---|---|---|
| 10,714,067 | B1 * | 7/2020 | Xu | G10H 1/0066 |
| 2001/0019323 | A1 * | 9/2001 | Ono | H01H 13/702 345/156 |
| 2011/0079496 | A1 * | 4/2011 | Lin | H01H 11/04 200/302.1 |
| 2014/0252882 | A1 | 9/2014 | Dinh et al. | |
| 2015/0130754 | A1 * | 5/2015 | Yairi | G06F 3/0445 345/174 |
| 2017/0308061 | A1 | 10/2017 | Bacher et al. | |
| 2021/0048846 | A1 | 2/2021 | Hinson | |

OTHER PUBLICATIONS

Schmitz et al., "Flexibles: Deformation-Aware 3D-Printed Tangibles for Capacitive Touchscreens," Presented at Proceedings of the 2017 CHI Conference on Human Factors in Computing Systems, Denver, CO, USA, May 6-11, 2017; CHI '17: Proceedings of the 2017 CHI Conference on Human Factors in Computing Systems, May 2017, 1001-1014.

21st Century Kinematics, 1st ed., McCarthy (ed.), 2013, Chapter 7, 28 pages.

Adafruit.com [online], "FLORA—Wearable electronic platform: Arduino-compatible—v3," available on or before Jul. 3, 2014 via Internet Archive: Wayback Machine URL<https://web.archive.org/web/20140703100531/https://www.adafruit.com/product/659>, retrieved on Feb. 10, 2022, retrieved from URL<https://www.adafruit.com/product/659>, 10 pages.

Amazon.com [online], "Mini Electric Linear Actuator Stroke 2"—Force 4.5 lbs—12V | High-Speed 1.97"/sec-Weight 0.15KG Ideal for Intelligent Range Hood, Fan Blades, Cabinets, Window Opener, Robotics, Home Automation," upon information and belief, available no later than Feb. 8, 2022, retrieved on Feb. 10, 2022, retrieved from URL<https://www.amazon.com/dp/B07ZJ4R2NR/ref=twister_B07ZJ7DJ11?_encoding=UTF8&psc=1>, 8 pages.

AMFG.ai [online], "The Additive Manufacturing Industry Landscape 2020: 240 Companies Driving Digital Manufacturing [Updated]," May 26, 2020, retrieved on Feb. 10, 2022, retrieved from URL<https://amfg.ai/2020/05/26/the-additive-manufacturing-industry-landscape-2020-231-companies-driving-digital-manufacturing/>, 11 pages.

Arduino.cc [online], "Arduino Uno Rev3," available on or before Sep. 1, 2021 via Internet Archive: Wayback Machine URL<https://web.archive.org/web/20210901044607/https://store.arduino.cc/products/arduino-uno-rev3/>, retrieved on Feb. 10, 2022, retrieved from URL<https://store.arduino.cc/products/arduino-uno-rev3/>, 8 pages.

Autodesk.com [online], "Fusion 360," available on or before Jun. 29, 2013 via Internet Archive: Wayback Machine URL<https://web.archive.org/web/20130629013046/https://www.autodesk.com/products/fusion-360/overview>, retrieved on Sep. 3, 2021, retrieved from URL<https://www.autodesk.com/products/fusion-360/overview>, 6 pages.

BareConductive.com [online], "Electric Paint," upon information and belief, available no later than Feb. 8, 2022, retrieved on Feb. 10, 2022, retrieved from URL<https://www.bareconductive.com/products/electric-paint?variant=37766230900916>, 9 pages.

BPS Customs [online], "How Keyboards & Mice Are Made—China Factory Tour!," Apr. 10, 2019, retrieved on Feb. 10, 2022, retrieved from URL<https://www.youtube.com/watch?v=GdwkFLLdgYI&ab_channel=BPSCustoms>, 3 pages [video submission].

Burstyn et al., "PrintPut: Resistive and Capacitive Input Widgets for Interactive 3D Prints," Lecture Notes in Computer Science: Human-Computer Interaction—Interact 2015, Aug. 30, 2015, 9296:332-339.

Davis et al., "TangibleCircuits: An Interactive 3D Printed Circuit Education Tool for People with Visual Impairments," Presented at Proceedings of the 2020 CHI Conference on Human Factors in Computing Systems, Honolulu, HI, USA, Apr. 25-30, 2020, 13 pages.

EnablingDevices.com [online], "Talkables With Built-in Icon Holders," available on or before Oct. 8, 2019 via Internet Archive: Wayback Machine URL<https://web.archive.org/web/20191008232935/https://enablingdevices.com/product/talkables-wbuilt-in-icon-holders/>, retrieved on Feb. 10, 2022, retrieved from URL<https://enablingdevices.com/product/talkables-wbuilt-in-icon-holders/>, 4 pages.

Flowers et al., "3D printing electronic components and circuits with conductive thermoplastic filament," Additive Manufacturing, Dec. 2017, 18:156-163.

Fuge et al., "The MechProcessor: Helping Novices Design Printable Mechanisms Across Different Printers," Journal of Mechanical Design, Nov. 2015, 137(11):111415, 9 pages.

Gong et al., "MetaSense: Integrating Sensing Capabilities into Mechanical Metamaterial," Presented at Proceedings of The 34th Annual ACM Symposium on User Interface Software and Technology, Virtual Event, USA, Oct. 10-14, 2021, 12 pages.

Götzelmann et al., "CapCodes: Capacitive 3D Printable Identification and On-screen Tracking for Tangible Interaction," Presented at Proceedings of NordiCHI '16: 9th Nordic Conference on Human-Computer Interaction, Gothenburg, Sweden, Oct. 23-27, 2016, 4 pages.

Graphene-Supermarket.com [online], "Graphene Supermarket," available on or before Feb. 2, 2011 via Internet Archive: Wayback Machine URL:https://web.archive.org/web/20110202193004/https://graphene-supermarket.com/home.php>, retrieved on Feb. 10, 2022, retrieved from URL<https://graphene-supermarket.com/home.php>, 2 pages.

Greenspan et al., "Designing Low-Cost Sports Prosthetics with Advanced 3D Printing Techniques," Presented at Proceedings of UIST '20 Adjunct: Adjunct Publication of the 33rd Annual ACM Symposium on User Interface Software and Technology, Oct. 20, 2020, 126-128.

He et al., "Ondulé: Designing and Controlling 3D Printable Springs," Presented at Proceedings of the 32nd Annual ACM Symposium on User Interface Software and Technology, New Orleans, LA, USA, Oct. 20-23, 2019, 739-750.

Ion et al., "Digital Mechanical Metamaterials," Presented at Proceedings of the Conference on Human Factors in Computing Systems, Denver, CO, USA, May 6-11, 2017, 977-988.

Ion et al., "Metamaterial Mechanisms," Presented at Proceedings of the 29th Annual Symposium on User Interface Software and Technology, Tokyo, Japan, Oct. 16-19, 2016, 529-539.

Iyer et al., "3D printing wireless connected objects," ACM Transactions on Graphics, Nov. 2017, 36(6):242, 13 pages.

Lazarus et al., "3-D Printing Structural Electronics with Conductive Filaments," IEEE Transactions on Components, Packaging and Manufacturing Technology, Nov. 17, 2020, 10(12):1965-1972.

Megaro et al., "A computational design tool for compliant mechanisms," ACM Transactions on Graphics, Jul. 2017, 36(4):82, 12 pages.

Multi3DLLC.com [online], "Electrifi Conductive Filament," available on or before Sep. 13, 2020 via Internet Archive: Wayback Machine URL<https://web.archive.org/web/20200913055553/https://www.multi3dllc.com/product/electrifi/>, retrieved on Feb. 10, 2022, retrieved from URL<https://www.multi3dllc.com/product/electrifi/>, 5 pages.

PopSci.com [online], "The best mechanical keyboards let you game, code, type, and work smoother and faster," Feb. 4, 2021, retrieved on Feb. 10, 2022, retrieved from URL<https://www.popsci.com/story/reviews/best-mechanical-keyboard/>, 5 pages.

Proto-pasta.com [online], "Electrically Conductive Composite PLA," available on or before May 7, 2015 via Internet Archive: Wayback Machine URL<https://web.archive.org/web/20150507001513/https://

(56) References Cited

OTHER PUBLICATIONS www.proto-pasta.com/products/conductive-pla>, retrieved on Sep. 7, 2021, retrieved from URL<https://www.proto-pasta.com/products/conductive-pla>, 5 pages.

Reddit.com [online], "I 3D printed a PCG for Pico.," Feb. 24, 2021, retrieved on Feb. 10, 2022, retrieved from URL<https://www.reddit.com/r/raspberry_pi/comments/lrwymw/i_3d_printed_a_pcb_for_pico/>, 21 pages.

Rhino3D.com [online], "Grasshopper—New in Rhino 6," available on or before Jun. 3, 2019 via Internet Archive: Wayback Machine URL<https://web.archive.org/web/20190603195053/https://www.rhino3d.com/6/new/grasshopper/> retrieved on Feb. 10, 2022, retrieved from URL<https://www.rhino3d.com/6/new/grasshopper/>, 6 pages.

Rhino3D.com [online], "Rhinoceros," available on or before Dec. 23, 1996 via Internet Archive: Wayback Machine URL<https://web.archive.org/web/19961223083529/https://www.rhino3d.com/>, retrieved on Feb. 10, 2022, retrieved from URL<https://www.rhino3d.com/>, 2 pages.

Schmitz et al., "Capricate: A fabrication pipeline to design and 3D print capacitive touch sensors for interactive objects," Presented at Proceedings of the 28th Annual ACM Symposium on User Interface Software & Technology, Charlotte, NC, USA, Nov. 8-11, 2015, 253-258.

Schumacher et al., "Microstructures to control elasticity in 3D printing," ACM Transactions on Graphics, Aug. 2015, 34(4):136, 13 pages.

SeeedStudio.com [online], "4A Motor Shield," available on or before Mar. 5, 2018 via Internet Archive: Wayback Machine URL<https://web.archive.org/web/20180305184815/https://wiki.seeedstudio.com/4A_Motor_Shield/> , retrieved on Feb. 10, 2022, retrieved from URL<https://wiki.seeedstudio.com/4A_Motor_Shield/>, 7 pages.

Sparkfun.com [online], "Arduino Mega 2560 R3," available on or before Jan. 8, 2012 via Internet Archive: Wayback Machine URL<https://web.archive.org/web/20120108082715/https://www.sparkfun.com/products/11061>, retrieved on Feb. 10, 2022, retrieved from URL<https://www.sparkfun.com/products/11061>, 17 pages.

Sparkfun.com [online], "Load Cell—200kg, Disc (TAS606)." available on or before Sep. 5, 2015 via Internet Archive: Wayback Machine URL<https://web.archive.org/web/20150905174622/https://www.sparkfun.com/products/13332>, retrieved on Feb. 10, 2022, retrieved from URL<https://www.sparkfun.com/products/13332>, 7 pages.

Takada et al., "MonoTouch: Single capacitive touch sensor that differentiates touch gestures," Presented at Proceedings of the 2016 CHI Conference Extended Abstracts on Human Factors in Computing Systems, San Jose, CA, USA, May 7-12, 2016, 2736-2743.

Thingiverse.com [online], "Mechanical Keyboard—SiCK-68," Mar. 11, 2019, retrieved on Feb. 10, 2022, retrieved from URL<https://www.thingiverse.com/thing:3478494/files>, 3 pages.

Torres et al., "An approach for mechanical property optimization of fused deposition modeling with polylactic acid via design of experiments," Rapid Prototyping Journal, Mar. 21, 2016, 22(2):387-404.

Ultimaker.com [online], "Ultimaker Cura," available on or before Jul. 3, 2019 via Internet Archive: Wayback Machine URL<https://web.archive.org/web/20190703062848/https://ultimaker.com/software/ultimaker-cura>, retrieved on Sep. 7, 2021, retrieved from URL<https://ultimaker.com/software/ultimaker-cura>, 11 pages.

Ultimaker.com [online], "Ultimaker PLA," available on or before May 15, 2020 via Internet Archive: Wayback Machine URL<https://web.archive.org/web/20200515043326/https://ultimaker.com/materials/pla>, retrieved on Feb. 10, 2022, retrieved from URL<https://ultimaker.com/materials/pla>, 5 pages.

Ultimaker.com [online], "Ultimaker S5," available on or before Dec. 12, 2019 via Internet Archive: Wayback Machine URL<https://web.archive.org/web/20191212042119/https://ultimaker.com/3d-printers/ultimaker-s5>, retrieved on Sep. 7, 2021, retrieved from URL<https://ultimaker.com/3d-printers/ultimaker-s5>, 9 pages.

Wired.com [online], "Apple's MacBook Pro Gets an All-New Keyboard," Nov. 13, 2019, retrieved on Feb. 10, 2022, retrieved from URL<https://www.wired.com/story/apple-macbook-pro-16-2019/>, 9 pages.

Office Action in European Appln. No. 22170511.4, dated Feb. 23, 2024, 4 pages.

* cited by examiner

3D-PRINTED DEFORMABLE INPUT DEVICES

CROSS-REFERENCE TO RELATED APPLICATION

This application claims the benefit of U.S. Provisional Application No. 63/186,281, filed May 10, 2021, and titled “3D-Printed Deformable Input Devices,” which is incorporated by reference.

TECHNICAL FIELD

This disclosure generally relates to input devices such as switches and keyboards.

BACKGROUND

To produce a conventional keyboard, the keycaps, printed circuit board (PCB), mechanical springs, switches and the shell are all manufactured separately and need to be assembled after each component is created. Using individual design tools, some of these components can be created using 3D-printing, but there are no means to combine the components other than by assembly and/or other post-processing techniques.

SUMMARY

In general, an aspect of the subject matter described in this specification relates to the use of multi-material 3D-printing (additive manufacturing) to produce durable and attractive finished input devices, such as switches and keyboards, from mixtures of polymers, organic materials, and/or metals. These items can include both mechanical and electrical systems, and the ability to be deformed or deflected during use. In some embodiments, such items can be 3D-printed in a single 3D-printing process run using multi-material 3D-printing processes.

Some aspects described herein include using multi-material 3D printing to create custom input devices by combining inventive aspects such as: (i) custom deformable 3D-printed items, (ii) 3D-printed structural electronics, (iii) 3D printed springs, (iv) 3D-printed enabled interfaces, and/or (v) 3D-printed capacitive touch interfaces. This disclosure describes these advanced manufacturing techniques to design and produce 3D-printed deformable input devices, in one print, without post-processing, and without sacrificing functionality. Alternatively, in some embodiments two or more prints can be used to produce deformable input devices described herein. Multiple non-limiting examples of the inventive disclosure are provided below, including descriptions related to example input devices such as a computer keyboard, gamepad, analog trigger, joystick, and piano keyboard, all respectively manufacture-able in a single 3D-print run. Some such input devices can be 3D-printed to provide a finished item without the need for post-processing or assembly, or requiring only minimal post-processing or assembly.

Currently when a designer or engineer wants to prototype a part with the design properties of the devices described herein, she/he would be required to create multiple component parts and then assemble them once all prints are completed. Prototyping input devices such as those described herein adds another layer of complexity because both mechanical and electrical systems are required, which means relying on multiple manufacturing processes. Creating full devices with fewer parts and with a single manufacturing process can drastically reduce the time and cost it takes to manufacture components and finished devices. Furthermore, being able to 3D-print such devices in a single print process/run further reduces the time and cost, allowing for more design iterations to take place, ultimately leading to a better result.

In one aspect, this disclosure is directed to an electrical input device that includes a non-conductive material portion and a conductive material portion. The non-conductive and conductive material portions are integrally formed using a multi-material 3D-printing process. Deformation of the electrical input device causes an electrical variance through the conductive material portion that is responsive to the deformation.

Such an electrical input device may optionally include one or more of the following features. The electrical variance through the conductive material portion may include closing an electrical circuit formed by the conductive material portion. The deformation of the electrical input device may provide a digital output. The electrical variance through the conductive material portion may include changing a resistance of an electrical circuit formed by the conductive material portion. The electrical variance through the conductive material portion may include changing a capacitance of an electrical circuit formed by the conductive material portion. The deformation of the electrical input device may provide an analog output. The analog output may correspond to an extent of the deformation. The analog output may be proportional to an extent of the deformation. The electrical input device may be a switch. The electrical input device may be a key for a computer keyboard. The electrical input device may be a key for a piano keyboard.

In another aspect, this disclosure is directed to a method of making an electrical input device. The method includes operating a multi-material 3D-printing process to integrally print a non-conductive material portion and a conductive material portion. Deformations of the electrical input device cause an electrical variance through the conductive material portion that is responsive to the deformations.

Such a method of making an electrical input device may optionally include one or more of the following features. The non-conductive material portion may include one or more helical springs. The electrical input device may be a switch. The electrical input device may be a computer keyboard. The electrical input device may be a piano keyboard.

The details of one or more implementations are set forth in the accompanying drawings and the description, below. Other potential features and advantages of the disclosure will be apparent from the description and drawings, and from the claims.

BRIEF DESCRIPTION OF THE DRAWINGS

Like reference symbols in the various drawings indicate like elements.

DETAILED DESCRIPTION

Figure 1:
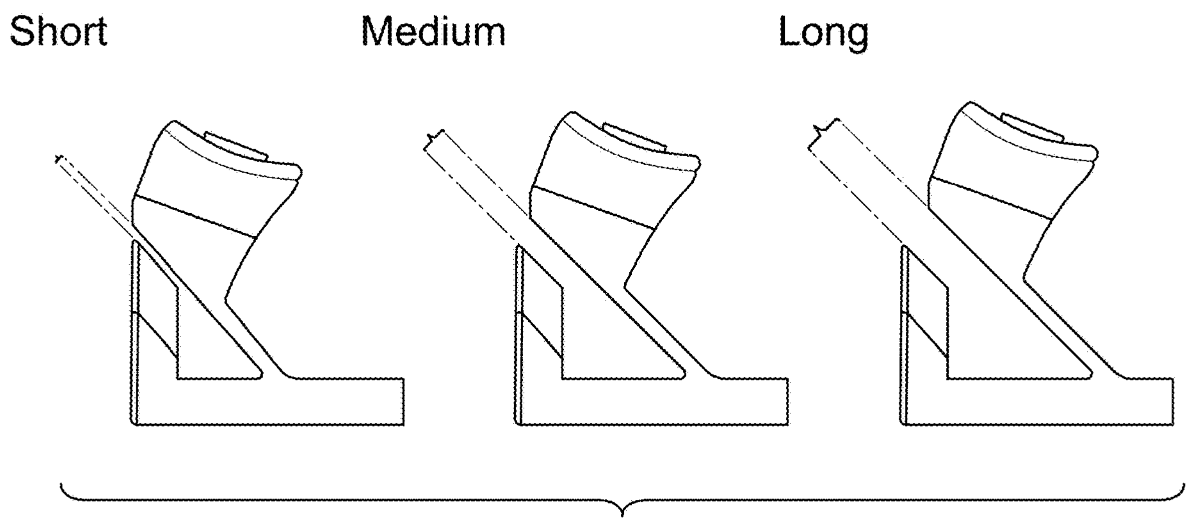
FIG. 1 is a side view of three different example variations of individual keys with differing travel distances for a computer keyboard that can be created using the materials and techniques described herein.

Referring to FIG. 1, three different example types of individual keys for a computer keyboard that can be created using the materials and techniques described herein are depicted. That is, as described further below, the depicted keys can be multi-material 3D printed such that they include a conductive material portion that is integrated with a non-conductive material portion. Accordingly, the depicted multi-material 3D printed keys are monolithic or unitary members comprised of at least two different materials.

The depicted keys are designed to be depressed (like a typical computer keyboard) to activate the key. When the keys are depressed to activate the keys, a portion of the key elastically deflects (like a cantilever spring). The keys rebound to the depicted configurations after being activated. The deflectable portions are integral portions of the monolithic keys. In other words, no separate springs are required as with a conventional computer keyboard. This advantageously eliminates or reduces the need for assembling a computer keyboard product after 3D-printing.

These three example keys are different from each other at least in terms of the travel distance, or the key depression distance, required to activate each of the keys. Input device structural parameters, such as key depression distance, can be customized to provide input devices with desired types of performance and/or functionality. In addition to the key depression distance, other parameters can be strategically selected to customize the performance and/or functionality of the keys. For example, such parameters can include material selection (e.g., traditional PLA, carbon-composite PLA, copper composite polyester, ABS, PET, PETG, PTFE, Nylon, TPU PVA, etc.), wall thickness and other part geometry (cross-sectional shapes), print orientation, print speed, infill pattern, and infill print percentage (density), without limitation. Accordingly, the material properties of the final object can be customized and finely tuned instead of only relying on the material it is made from. Such parameters can have significant effects on the mechanical properties of the 3D-printed keys (and the other 3D-printed members described below).

Broadly, metamaterials and compliant mechanisms are a new class of 3D printed objects where the material properties of the component are defined by the internal geometry and structure of the object, and not by the material itself. Metamaterial assemblies allow for a single part to have multiple mechanical properties in the same print. Because of this, full products can be printed in one print reducing the need for assembling a product after printing.

In addition, new materials enable 3D printed electronics. These materials allow for 3D prints to act as sensors, transmitters, and conductive traces without the need for additional electronics minimizing the number of components required, assembly time, weight, and cost.

Figure 2:
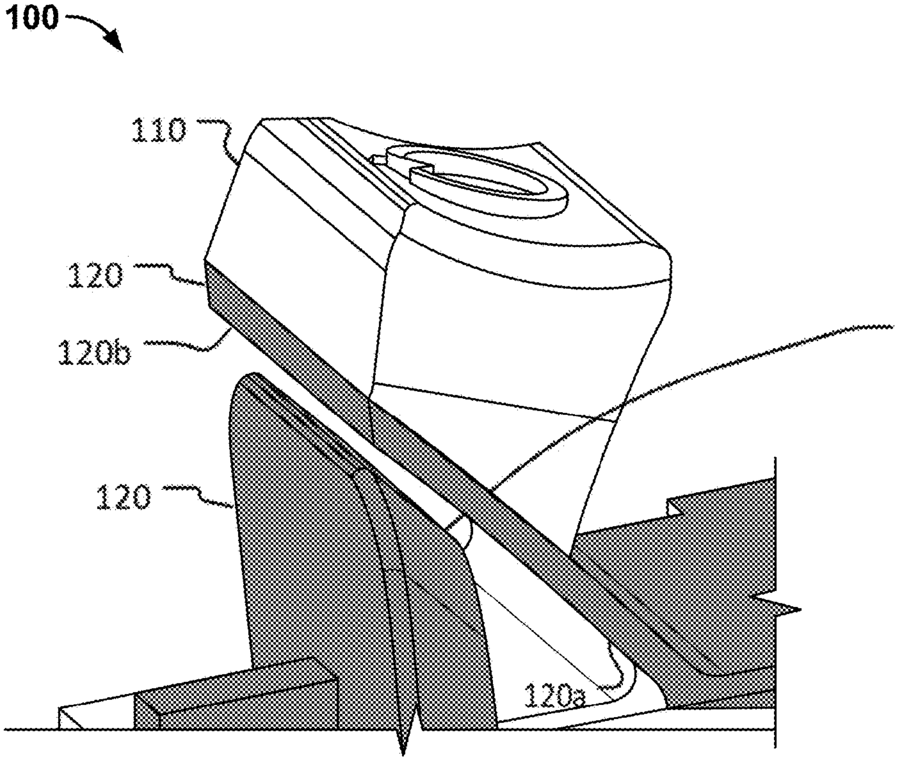
FIG. 2 is an enlarged perspective view of an example key of FIG. 1.

Referring also to FIG. 2, an example computer keyboard key 100 can be constructed of two materials using a multi-material 3D-printing process. For example, in the depicted embodiment the key 100 comprises or consists of a non-conductive material 110 and an electrically conductive material 120. The non-conductive material 110 and the electrically conductive material 120 are integrated with each other as a result of the use of a multi-material 3D-printing process to create the key 100.

In the depicted embodiment, the flexible portion of the key 100 is wholly made of the electrically conductive material 120. In particular, the flexible portion **120*a* is made of the electrically conductive material 120. In addition, the electrically conductive material 120 makes up the two contact portions 120*b* and 120*c*. The flexible portion 120*a* elastically deflects and the conductive contact portions 120*b* and 120*c* physically contact each other when the key 100 is depressed sufficiently. The physical abutment between the conductive contact portions 120***b* and 120*c* closes an electrical circuit and thereby functionally indicates that the key 100 is activated. This provides a digital output signal (on or off) from the key 100.

While in the depicted example key 100 the flexible portion 120*a* is made entirely of the electrically conductive material 120, such a construction is not required in all embodiments. For example, as described below in reference to the example of FIGS. 8 and 9, many other variations are possible and are within the scope of this disclosure.

Figure 3:
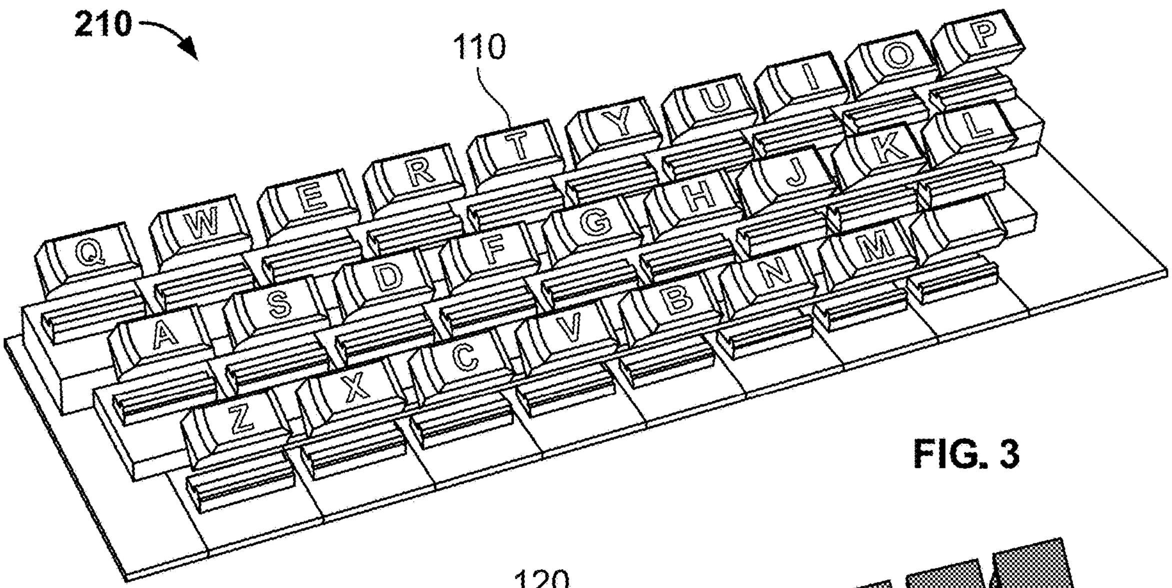
FIG. 3 is a perspective view of a 3D-printed non-conductive material portion of an example computer keyboard that can be created using the materials and techniques described herein.
Figure 4:
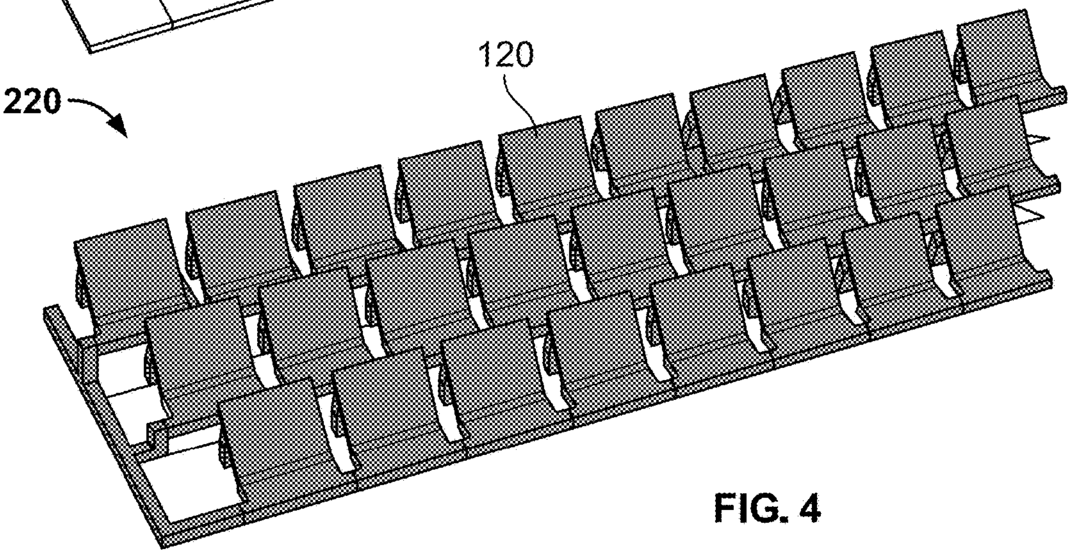
FIG. 4 is a perspective view of a 3D-printed conductive material portion of an example computer keyboard that can be created using the materials and techniques described herein.
Figure 5:
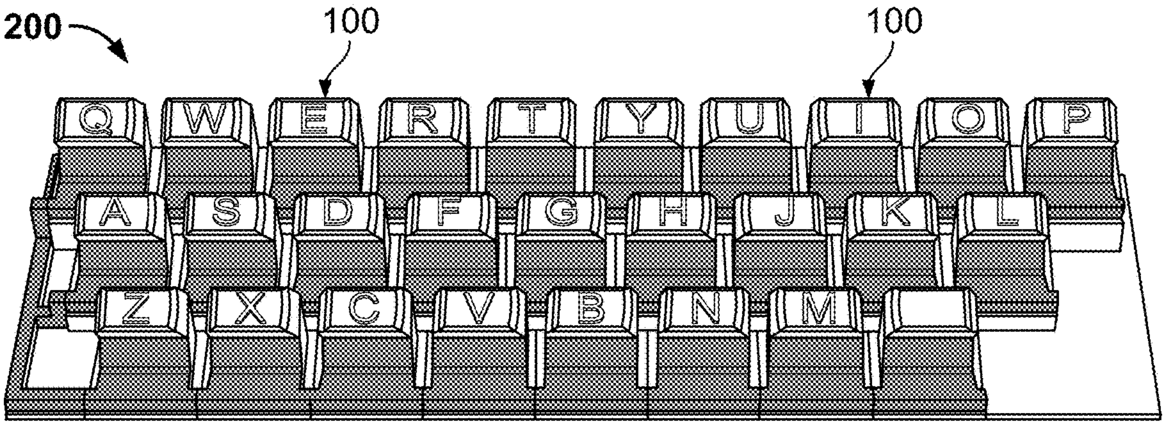
FIG. 5 is a perspective view of an example complete computer keyboard that can be created by multi-material 3D-printing the non-conductive material portion of FIG. 3 and the conductive material portion of FIG. 4 using the materials and techniques described herein.

FIGS. 3-5 illustrate an example computer keyboard 200 that can be multi-material 3D-printed in a singular print run to create a fully functional QWERTY keyboard without the need for assembly and/or other post-processing. The computer keyboard 200 (FIG. 5) includes an electrically conductive material portion 220 (shown in isolation in FIG. 4) that is integrated during the 3D-printing process with a non-conductive material portion 210 (shown in isolation in FIG. 3). The non-conductive material portion 210 and the electrically conductive material portion 220 are shown separately in FIGS. 3 and 4, but that is only for the purpose of facilitating an understanding of how each of those portions are integrally combined to make up the actual 3D-printed computer keyboard 200 shown in FIG. 5.

The computer keyboard 200 is constructed of multiple keys 100 (FIG. 2). Each of the keys 100 includes a non-conductive material 110 and an electrically conductive material 120.

Figure 6:
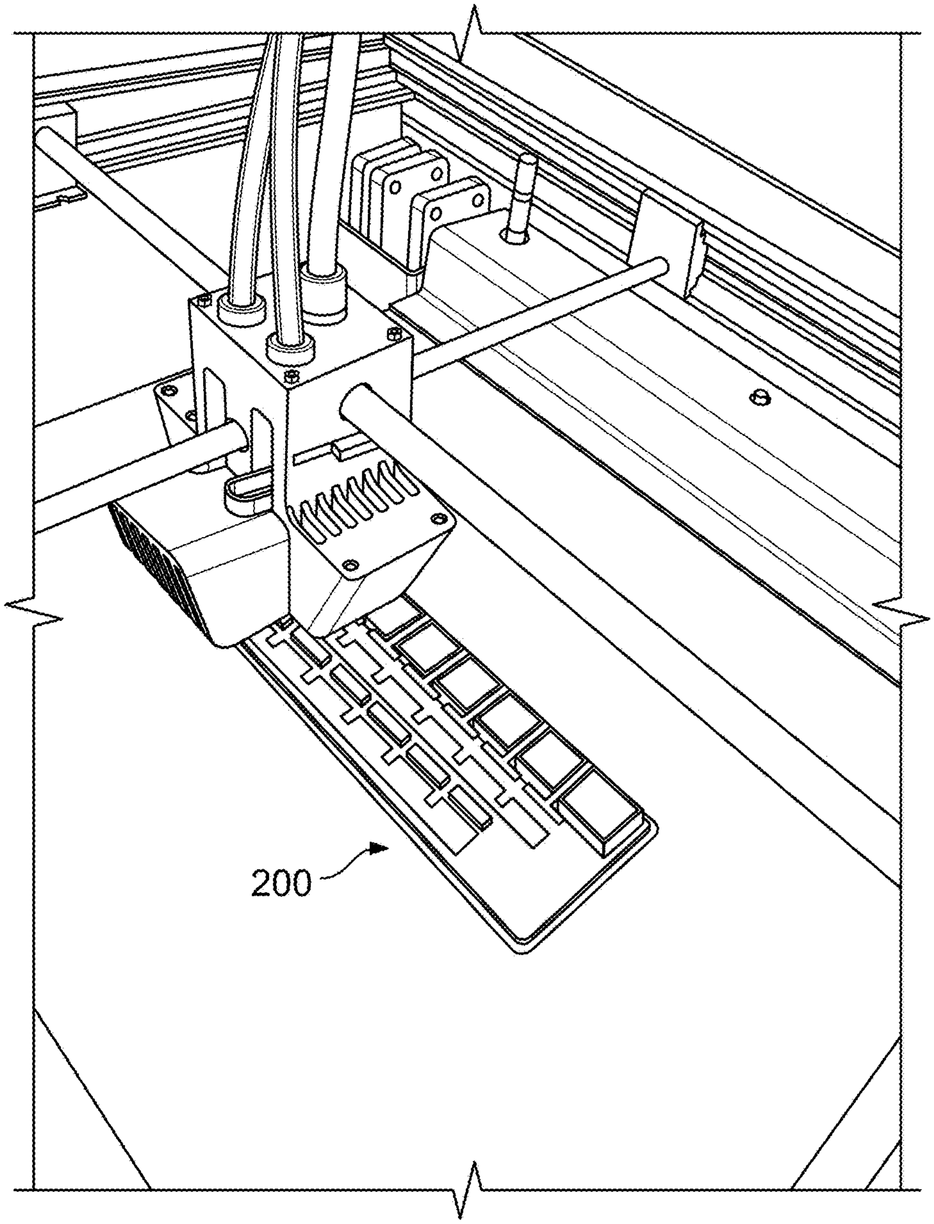
FIG. 6 illustrates a multi-material 3D-printing process making an example computer keyboard using the materials and techniques described herein.
Figure 7:
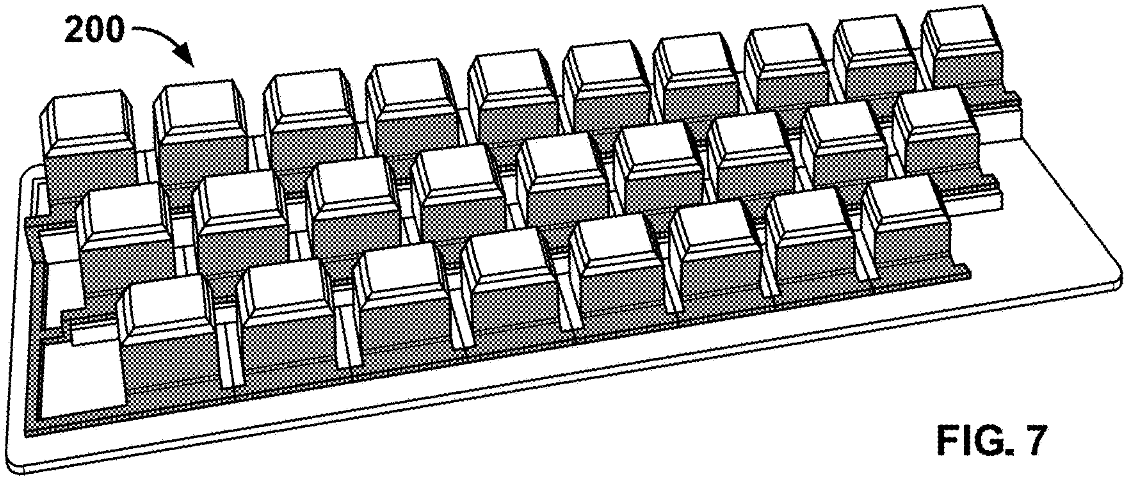
FIG. 7 illustrates the finished computer keyboard that was multi-material 3D-printed as shown in FIG. 6.

To confirm the concepts described herein, the inventors constructed an actual computer keyboard 200 using a multi-material 3D-printing process. FIG. 6 is an in-process illustration of the example computer keyboard 200 being multi-material 3D-printed. FIG. 7 shows the final resulting computer keyboard 200 that was created by the multi-material 3D-printing process. The process included the integral 3D-printing of the non-conductive material portion 210 of FIG. 3 and the conductive material portion 220 of FIG. 4 using the materials and techniques described herein.

Figure 8:
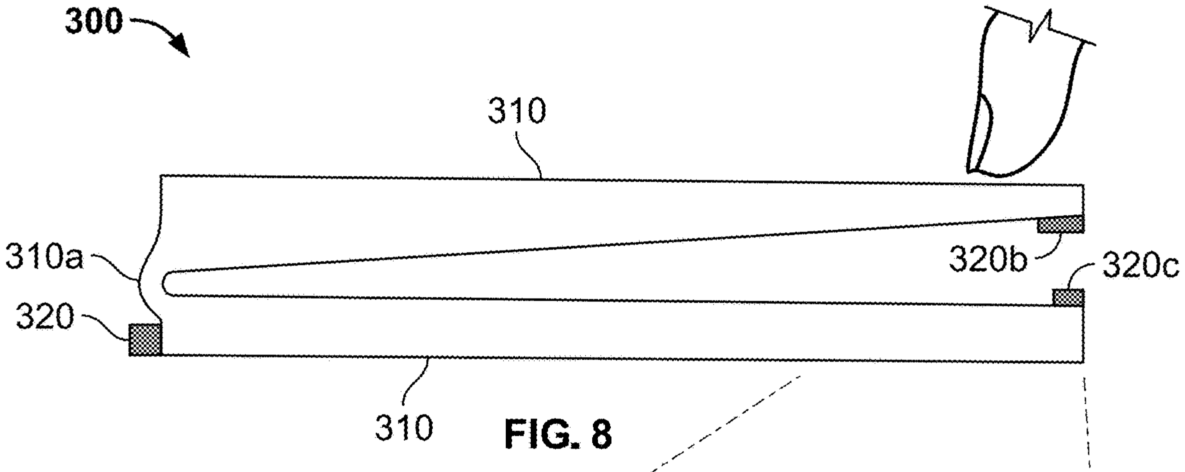
FIG. 8 is a side view of an example piano key for an electronic piano that can be created using the materials and techniques described herein.

Referring to FIG. 8, an example piano key 300 can be produced using the techniques described herein. The piano key 300 is shown in a side view. The piano key 300 comprises or consists of a non-conductive material portion 310 and an electrically conductive material portion 320. The non-conductive material 310 and the electrically conductive material 320 are integrated with each other as a result of the use of a multi-material 3D-printing process to create the piano key 300.

In the depicted example embodiment, the flexible portion of the key 300 is wholly made of the non-conductive material 310. In particular, the flexible portion 310*a* is made of the non-conductive material 310.

Figure 9:
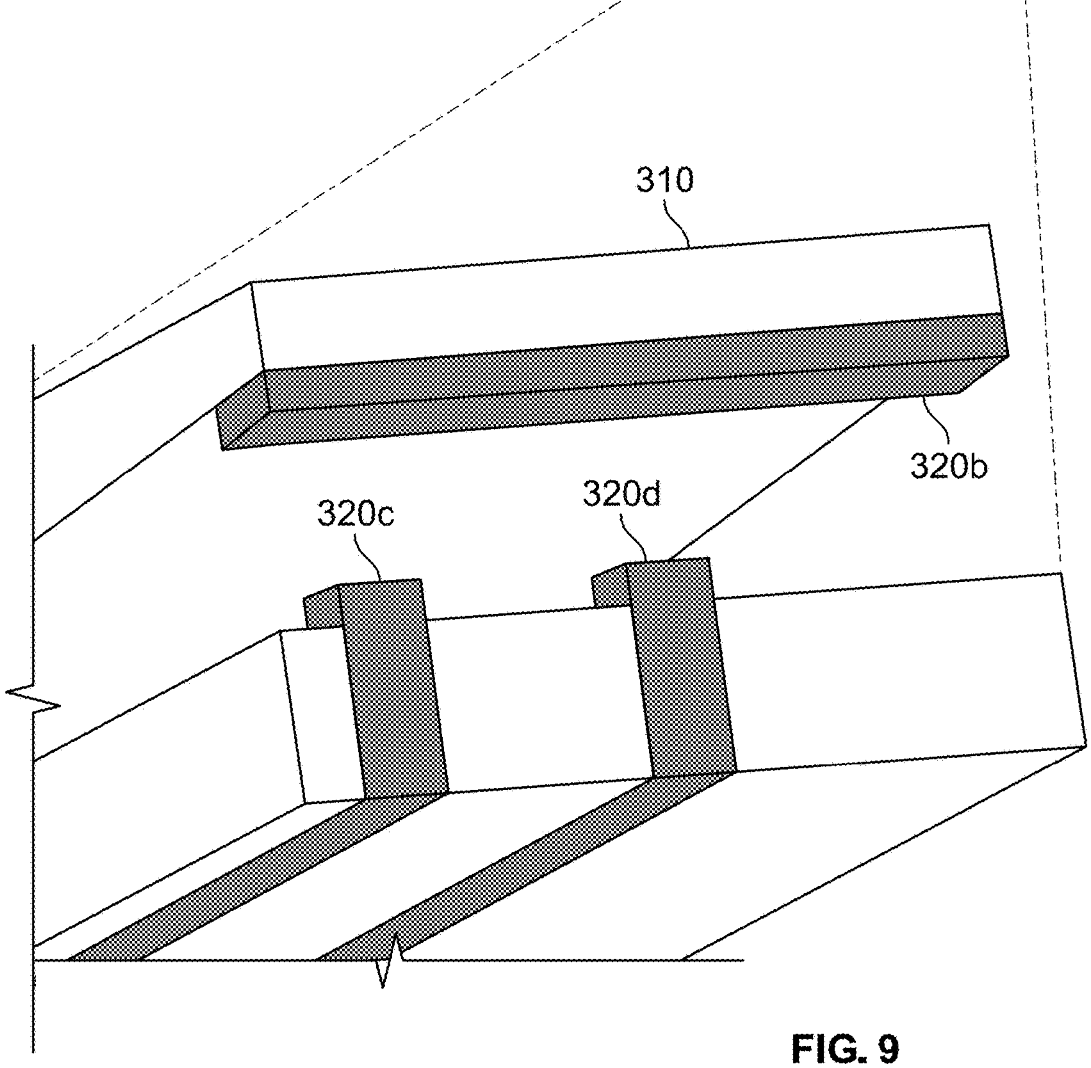
FIG. 9 is an enlarged perspective view of a portion of the example piano key of FIG. 8.

The electrically conductive material 320 makes up three contact portions 320*b*, 320*c*, and 320*d* (FIG. 9). The flexible portion 310*a* elastically deflects and the conductive contact portions 320*b*, 320*c*, and 320*d* physically and electrically connect with each other when the key 300 is depressed sufficiently.

Referring also to FIG. 9, as can be envisioned, the physical contact between the conductive contact portion 320*b* and the conductive contact portions 320*c*, and 320*d* closes an electrical circuit between the two separate traces of the electrically conductive material 320 that make up the contact portions 320*c* and 320*d*. That is, when the piano key 300 is depressed, the conductive contact portion 320*b* physically bridges and electrically connects the two separate contact portions 320*c* and 320*d* to thereby functionally indicate that the piano key 300 is activated. This opening or closing of the circuit between the two separate contact portions 320*c* and 320*d* provides a digital output signal (on or off) from the piano key 300.

While in the depicted example piano key 300 the flexible portion 310*a* is made entirely of the electrically non-conductive material 310, such a construction is not required in all embodiments. For example, as described above in reference to the example of FIG. 2, many other variations are possible and are within the scope of this disclosure.

Figure 10:
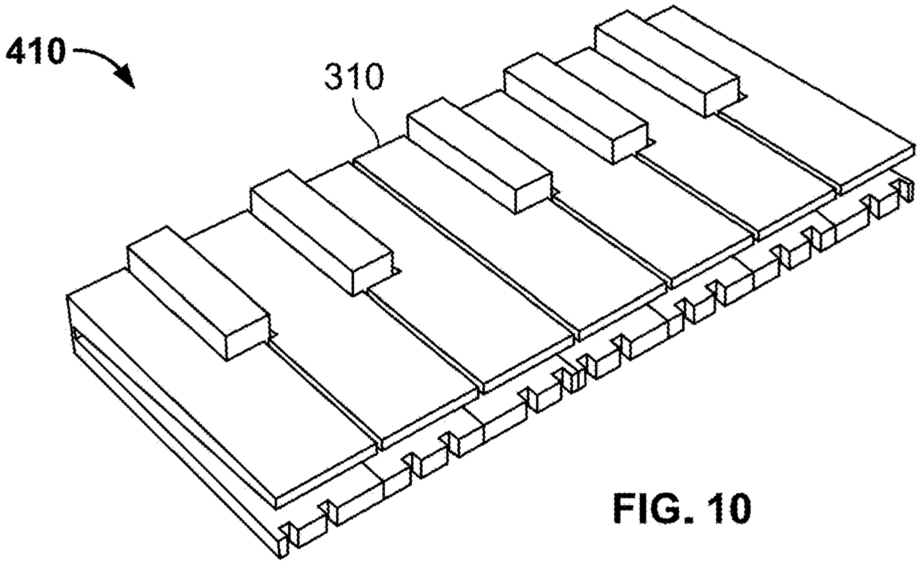
FIG. 10 is a perspective view of a 3D-printed non-conductive material portion of an example piano keyboard that can be created using the materials and techniques described herein.
Figure 11:
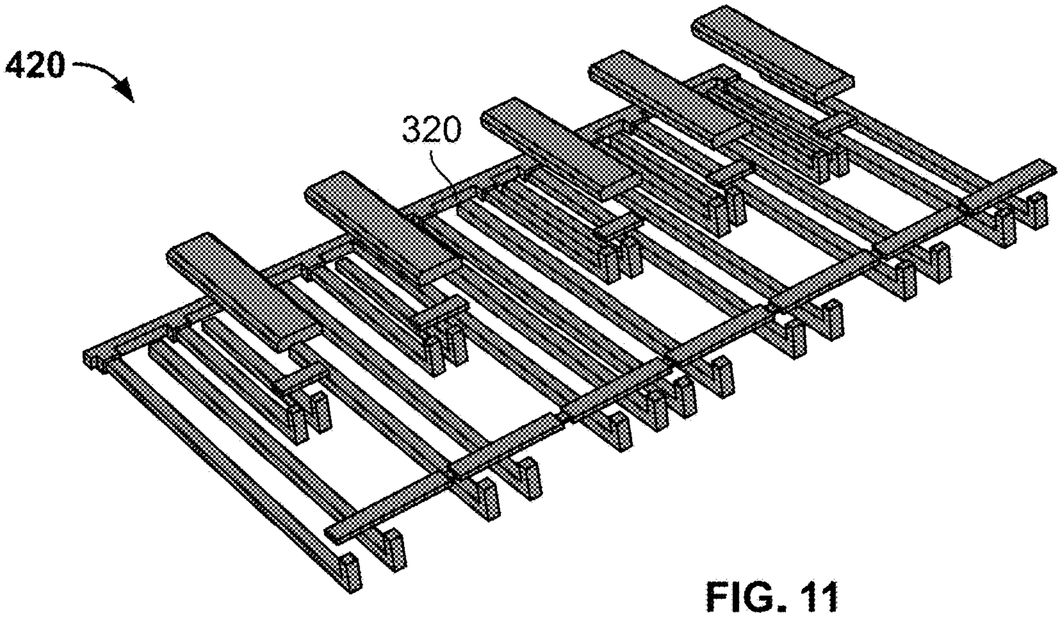
FIG. 11 is a perspective view of a 3D-printed conductive material portion of an example piano keyboard that can be created using the materials and techniques described herein.
Figure 12:
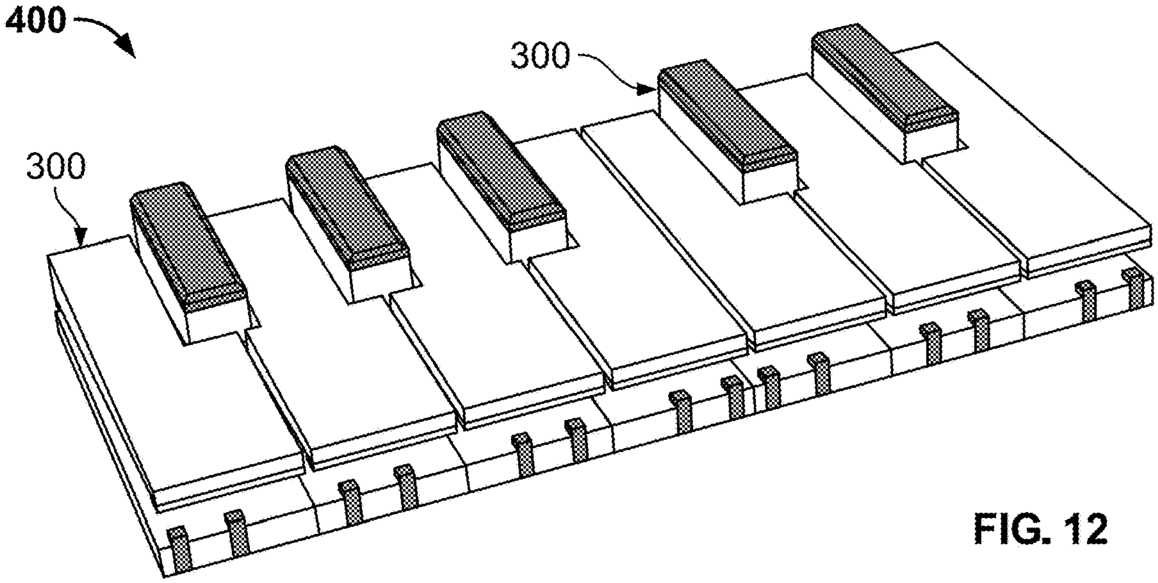
FIG. 12 is a perspective view of an example complete piano keyboard that can be created by multi-material 3D-printing the non-conductive material portion of FIG. 10 and the conductive material portion of FIG. 11 using the materials and techniques described herein.

FIGS. 10-12 illustrate an example piano keyboard 400 that can be multi-material 3D-printed in a singular print run with both its mechanical and electrical systems (not including the processor) to create a fully functional piano keyboard with only a minimal need for assembly and/or other post-processing. The piano keyboard 400 includes an electrically conductive material portion 420 (shown in isolation in FIG. 11) that is integrated during the 3D-printing process with a non-conductive material portion 310 (shown in isolation in FIG. 10). The non-conductive material portion 310 and the electrically conductive material portion 320 are shown separately in FIGS. 10 and 11, but that is only for the purpose of facilitating an understanding of how each of those portions are integrally combined to make up the actual 3D-printed computer keyboard 400 shown in FIG. 12.

The piano keyboard 400 is constructed of multiple piano keys 300 (FIGS. 8 and 9). Each of the keys 300 includes a non-conductive material portion 310 and an electrically conductive material portion 320.

Figure 14:
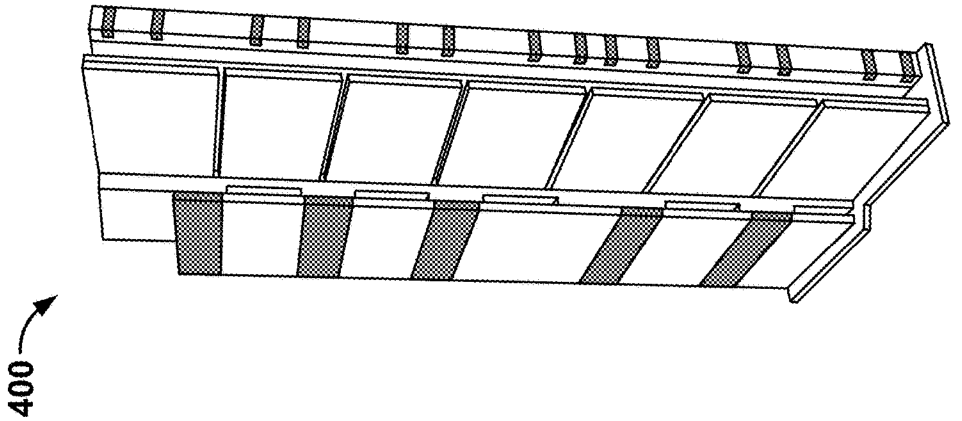
FIG. 14 illustrates the finished piano keyboard that was multi-material 3D-printed as shown in FIG. 13.
Figure 13:
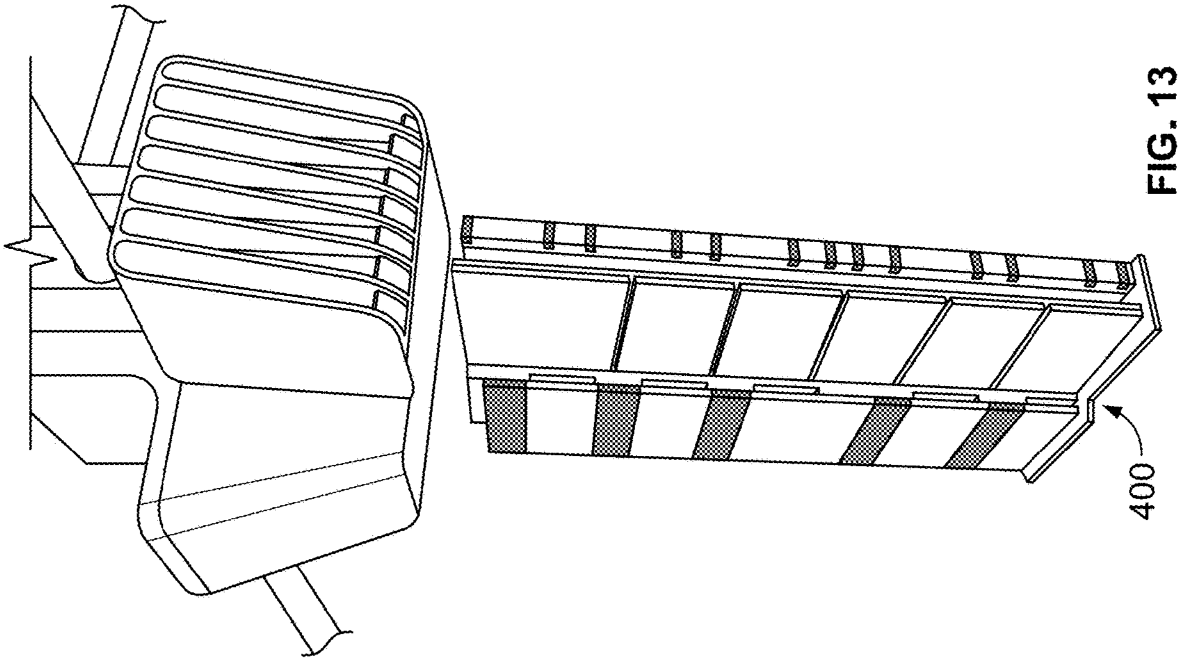
FIG. 13 illustrates a multi-material 3D-printing process making an example piano keyboard using the materials and techniques described herein.

To confirm the concepts described herein, the inventors constructed one octave of an actual piano keyboard 400 using a multi-material 3D-printing process. FIG. 13 is an in-process illustration of the example piano keyboard 400 being multi-material 3D-printed. FIG. 14 shows the final resulting piano keyboard 400 that was created by the multi-material 3D-printing process. The process included the integral 3D-printing of the non-conductive material portion 410 of FIG. 10 and the conductive material portion 420 of FIG. 11 using the materials and techniques described herein. The result was a fully functional piano keyboard 400 that did not require any additional assembly, and only required the removal of support material for post-processing.

Figure 15:
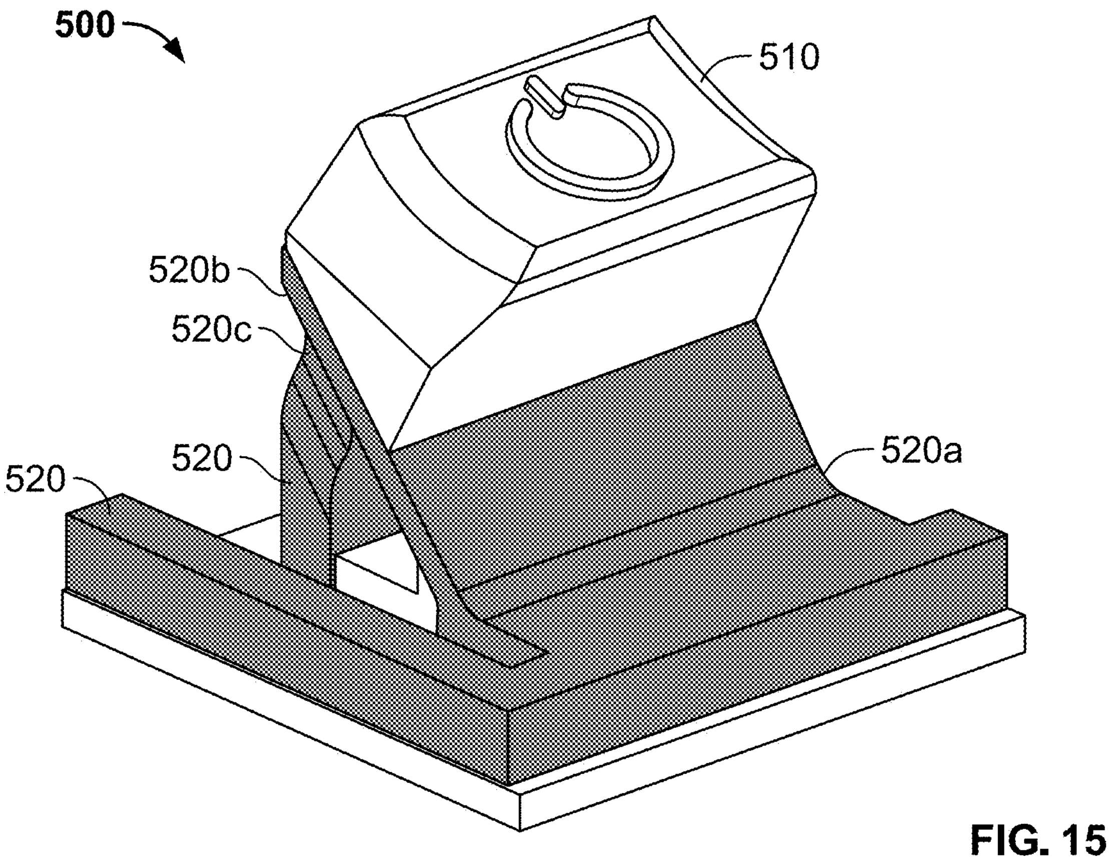
FIG. 15 is a perspective view of an example digital switch that can be created using the materials and techniques described herein.

Referring to FIG. 15, an example switch 500 can be constructed of two materials using a multi-material 3D-printing process. For example, in the depicted embodiment the switch 500 comprises or consists of a non-conductive material portion 510 and an electrically conductive material portion 520. The non-conductive material 510 and the electrically conductive material 520 are integrated with each other as a result of the use of a multi-material 3D-printing process to create the switch 500.

In the depicted embodiment, the flexible portion of the switch 500 is wholly made of the electrically conductive material 520. In particular, the flexible portion 520*a* is made of the electrically conductive material 520. In addition, the electrically conductive material 520 makes up the two contact portions 520*b* and 520*c*. The flexible portion 520*a* elastically deflects and the conductive contact portions 520*b* and 520*c* physically contact each other when the switch 500 is depressed sufficiently. The physical abutment between the conductive contact portions 520*b* and 520*c* closes an electrical circuit and thereby functionally indicates that the switch 500 is activated. This provides a digital output signal (on or off) from the switch 500.

While in the depicted example switch 500 the flexible portion 520*a* is made entirely of the electrically conductive material 520, such a construction is not required in all embodiments. For example, as described above in reference to the example of FIGS. 8 and 9, many other variations are possible and are within the scope of this disclosure.

Figure 16:
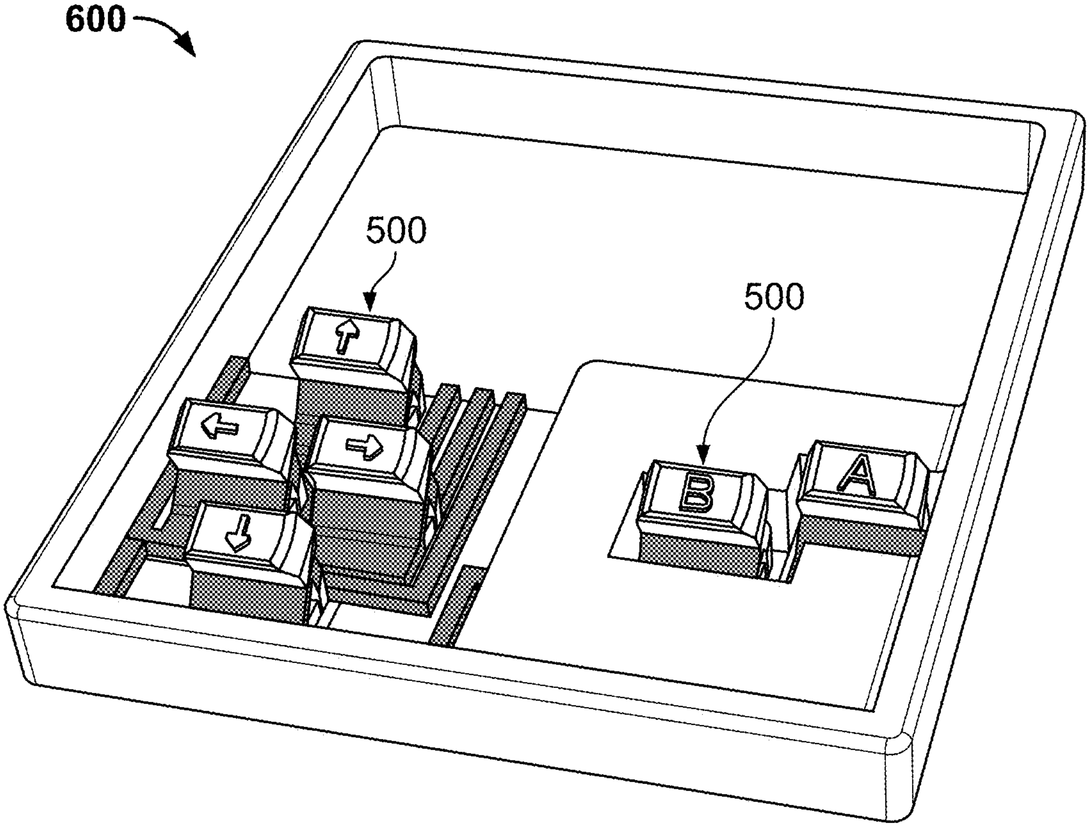
FIG. 16 is a perspective view of an example multi-material 3D-printed input device, such as a gamepad, that includes multiple digital switches similar to the switch shown in FIG. 15.
Figure 17:
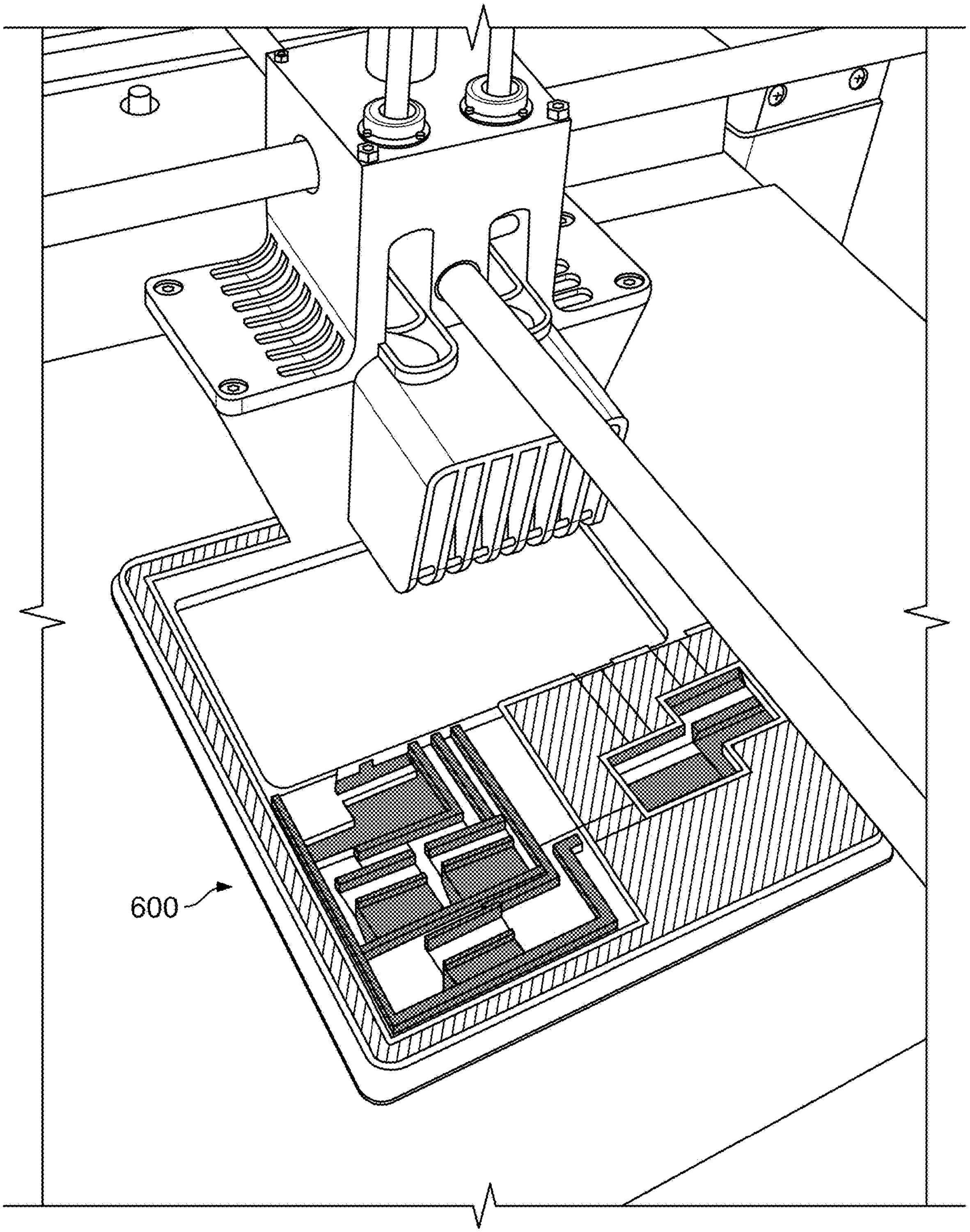
FIG. 17 illustrates a multi-material 3D-printing process making the example multi-material 3D-printed input device of FIG. 16 using the materials and techniques described herein.

The example switch 500 can be used in a great number of different contexts and devices. For example, FIG. 16 depicts an example controller 600 that includes multiple individual switches 500. As shown in the illustration of FIG. 17, the inventors actually constructed the example controller 600 using a multi-material 3D-printing process. The process consisted of the integral 3D-printing of the non-conductive material portion 510 of FIG. 15 and the conductive material portion 520 of FIG. 15 using the materials and techniques described herein. The result was the fully functional controller 600 that did not require any additional assembly or post-processing.

Figure 18:
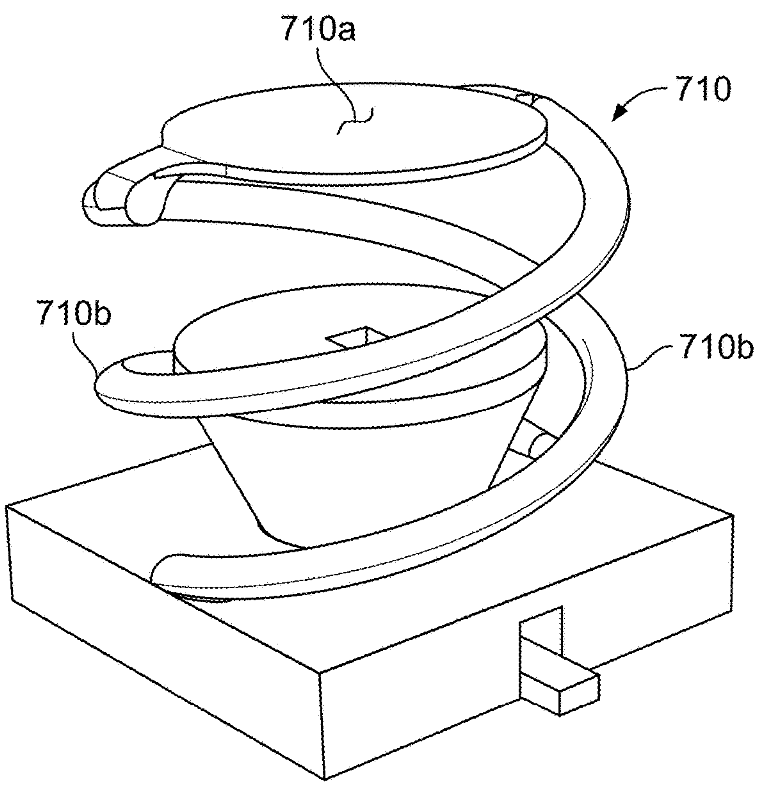
FIG. 18 is a perspective view of a 3D-printed non-conductive material portion of an example analog input device shown in FIG. 20.
Figure 19:
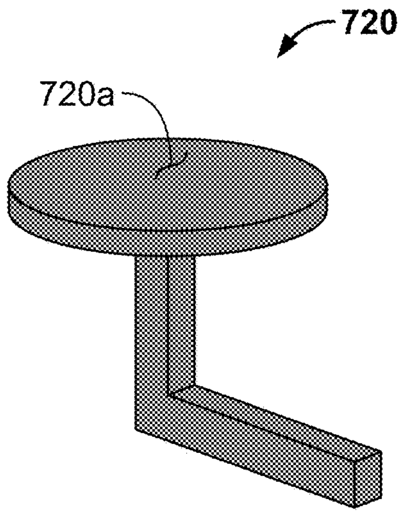
FIG. 19 is a perspective view of a 3D-printed electrically conductive material portion of the example analog input device of FIG. 20.
Figure 20:
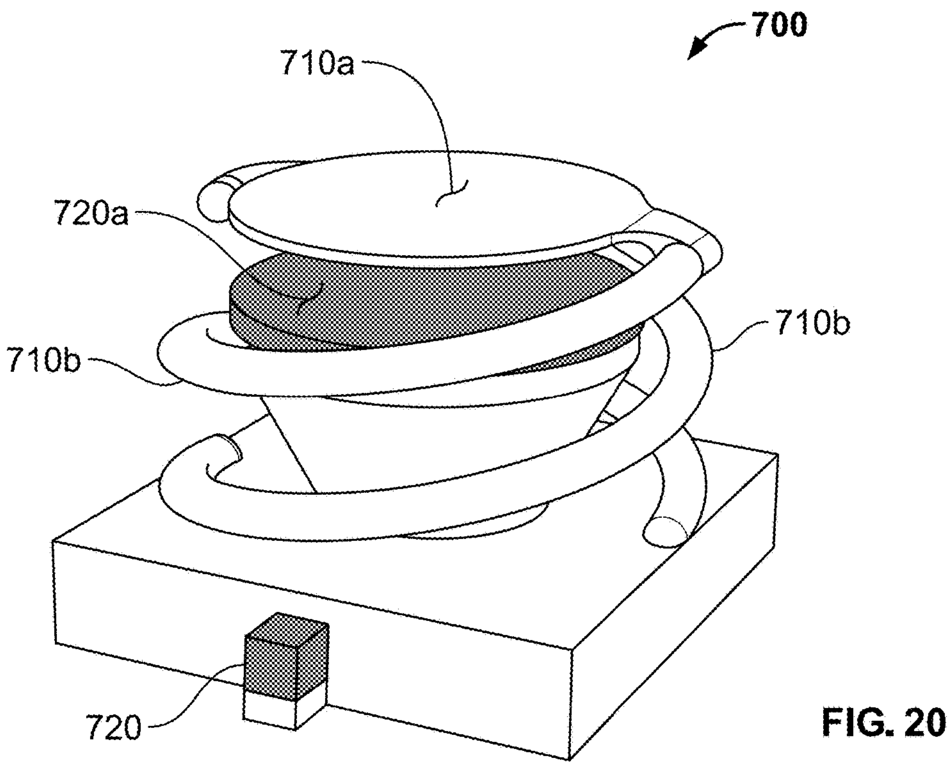
FIG. 20 is a perspective view of an example multi-material 3D-printed analog input device that can be created using the materials and techniques described herein.

Referring to FIGS. 18-20, in addition to the digital input devices described above, the inventive concepts described herein can also be employed to create deformable analog input devices. For example, an example analog input device 700 has been designed and multi-material 3D-printed. The analog input device 700 comprises or consists of a non-conductive material portion 710 (shown in isolation in FIG. 18) and an electrically conductive material portion 720 (shown in isolation in FIG. 19). The non-conductive material portion 710 and the electrically conductive material portion 720 are integrated with each other (as shown in FIG. 20) as a result of the use of a multi-material 3D-printing process to create the analog input device 700.

The non-conductive material portion 710 of the analog input device 700 includes a thin non-conductive depressible surface 710*a* that is attached to an elastically deformable double helical spring 710*b*. The electrically conductive material portion 720 of the analog input device 700 includes an electrode 720*a* positioned normal to the travel axis of the depressible surface 710*a*. In this configuration, as a user presses her/his finger on the depressible surface 710*a*, the user has fine control over how close her/his finger is positioned to the electrode 720*a*.

As the depressible surface 710*a* is pushed/moved by the user toward the electrode 720*a*, the electrode 720*a* records a change in capacitance in correspondence to the distance between the user's finger (which is in contact with the depressible surface 710*a*) and the electrode 720*a*. That capacitance can be measured to provide an indication of the distance between the depressible surface 710*a* (while in contact with the user's finger) and the electrode 720*a*.

Figure 21:
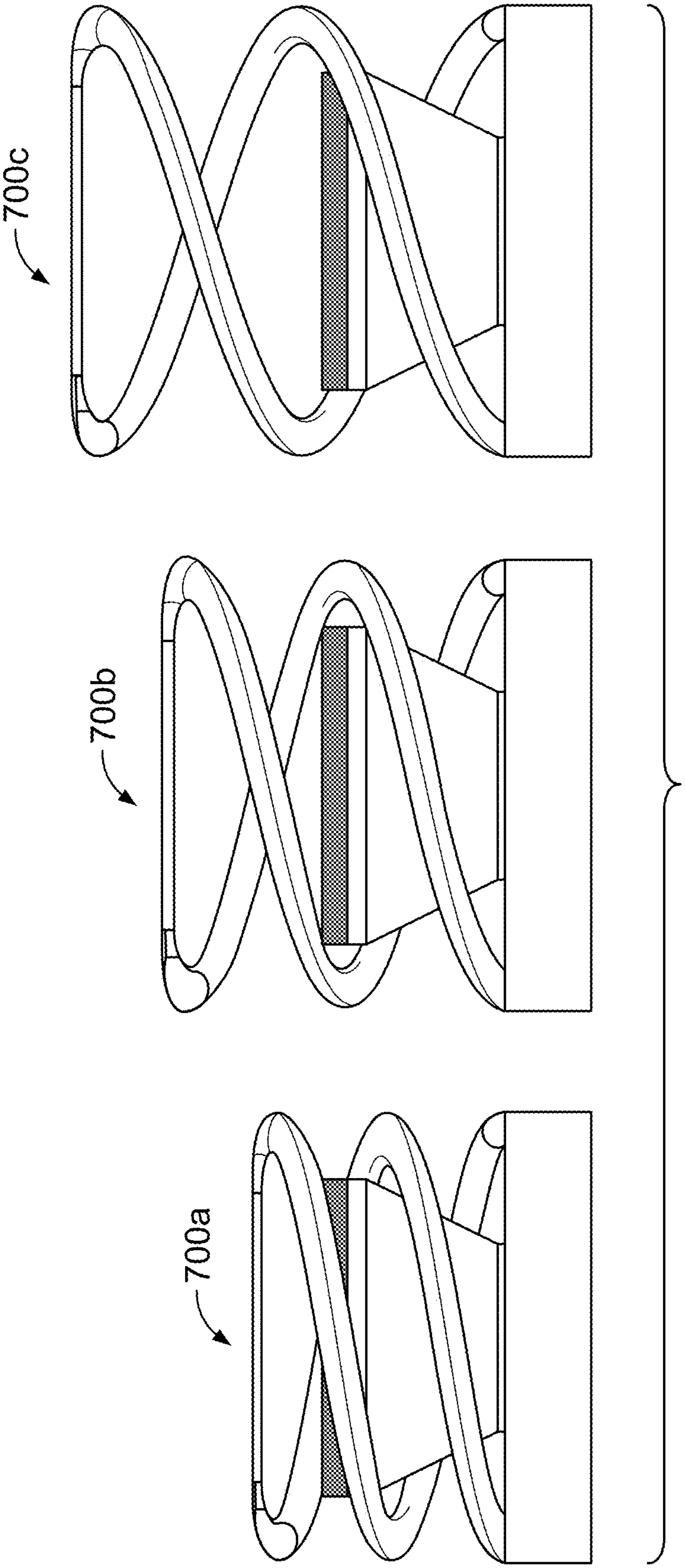
FIG. 21 shows side views of three additional example multi-material 3D-printed analog input devices, with differing travel distances, that can be created using the materials and techniques described herein.

FIG. 21 shows some examples of how design parameters of the analog input device 700 can be strategically selected to provide the performance characteristics of the analog input device 700 that are desired. In particular, the analog input device 700*a* has a short travel distance, the analog input device 700*b* has a medium travel distance, and the analog input device 700*c* has a long travel distance. These differences are the result of differing lengths of the deformable double helical springs. It can be envisioned that other aspects of the analog input device 700 can similarly be strategically selected to provide differing performance characteristics of the analog input device 700. For example, the spring constant or stiffness of the deformable double helical spring can be strategically selected to provide differing performance characteristics of the analog input device 700

Figure 22:
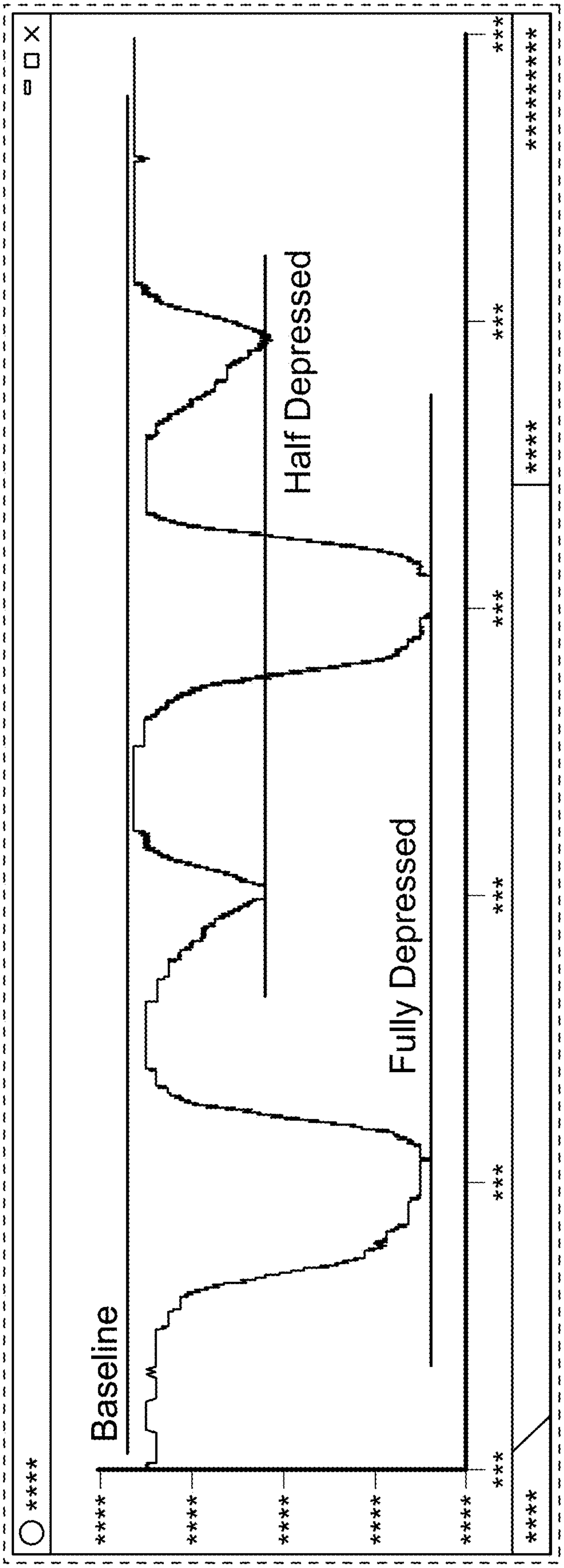
FIG. 22 is a graph that depicts the analog output of the example multi-material 3D-printed analog input device of FIG. 20 in various different states of activation.

FIG. 22 shows a plot of an actual test that was performed to determine the changes in capacitance of the analog input device 700 in response to the extent of depression of the depressible electrode 710. It can be seen that the "half depressed" capacitance is close to halfway between the "baseline" capacitance (not depressed) and "fully depressed." Accordingly, it can be envisioned that the analog input device 700 truly acts as an analog input device. In other words, the extent or distance of the deformation of the analog input device 700 can be determined or estimated by monitoring the electrical capacitance of the analog input device 700. In some embodiments, the changes of the electrical capacitance in response to the deformation of the analog input device 700 are proportional to the extent of deformation of the analog input device 700.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described herein as acting in certain combinations and even initially claimed as such, one or more features from a claimed combination can in some cases be excised from the combination, and the claimed combination may be directed to a subcombination or variation of a subcombination.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results.

What is claimed is:

1. A method of making an electrical input device, the method comprising:

operating a multi-material 3D-printing process to produce, by additive manufacturing, the electrical input device in a single 3D-printing process run, wherein the electrical input device produced by the single 3D-printing process comprises: (i) a non-conductive material portion and (ii) a conductive material portion that is integrally formed with the non-conductive material portion, and wherein deformations of the electrical input device cause an electrical variance through the conductive material portion that is responsive to the deformations.

2. The method of claim 1, wherein the non-conductive material portion includes one or more helical springs.

3. The method of claim 2, wherein the deformations of the electrical input device caused by a human body part provide an analog output that corresponds to an extent of the deformation.

4. The method of claim 3, wherein the analog output comprises changing a capacitance of the conductive material portion.

5. The method of claim 1, wherein the electrical input device is a switch.

6. The method of claim 1, wherein the electrical input device is a computer keyboard.

7. The method of claim 1, wherein the electrical input device is a piano keyboard.

8. The method of claim 1, wherein the electrical variance through the conductive material portion comprises closing an electrical circuit formed by the conductive material portion.

9. The method of claim 1, wherein the electrical variance through the conductive material portion comprises changing a resistance of an electrical circuit formed by the conductive material portion.

* * * * *